United States Patent [19]

Gershenson

[11] Patent Number: 5,045,194

[45] Date of Patent: Sep. 3, 1991

[54] FILTER APPARATUS HAVING A BAG WITH HANDLES

[75] Inventor: Moshe Gershenson, Mohegan Lake, N.Y.

[73] Assignee: GAF Chemicals Corporation, Wayne, N.J.

[21] Appl. No.: 502,715

[22] Filed: Apr. 2, 1990

[51] Int. Cl.⁵ .............................................. B01D 29/11
[52] U.S. Cl. .................................. 210/232; 210/445; 210/452; 210/470
[58] Field of Search ............... 29/426.6, 451; 210/232, 210/238, 470, 471, 480, 495, 445, 448, 451, 452; 55/361

[56] References Cited

U.S. PATENT DOCUMENTS

| | | | |
|---|---|---|---|
| 2,853,195 | 9/1958 | Malcolm | 210/471 |
| 3,780,871 | 12/1973 | Hicks et al. | 210/471 |
| 4,169,331 | 10/1979 | Baker | 210/471 |
| 4,225,437 | 9/1980 | Woodard | 210/470 |
| 4,481,117 | 11/1984 | Collins | 210/471 |
| 4,669,167 | 6/1987 | Asterlin | 210/232 |

Primary Examiner—Robert A. Dawson
Assistant Examiner—Wanda L. Millard
Attorney, Agent, or Firm—Richard T. Laughlin; Anthony Lagani, Jr.; Joshua J. Ward

[57] ABSTRACT

A filter apparatus having a bag filter subassembly for collecting contaminating material. The bag filter subassembly includes a bag filter having a top end portion and a gasket ring having a goove receiving the top end portion. The gasket ring has a pair of opposite, upright, axial handles each having a finger-grip, loop portion and a resilient stem portion. The upright handles, which are used for lifting the bag filter from an enclosure vessel deflect down to a radial position when a cover is positioned on the vessel and also spring up when the cover is removed.

6 Claims, 2 Drawing Sheets

FILTER APPARATUS HAVING A BAG WITH HANDLES

The invention relates to a filter apparatus having a bag with handles, and in particular the invention relates to a filter apparatus having a bag with self-positioning axial handles.

BACKGROUND OF THE INVENTION

The prior art filter apparatus having a bag with handles is described in U.S. Pat. No. 4,669,167, issued Jun. 2, 1987. Related patents include U.S. Pat. Nos.

3,771,664, issued Nov. 13, 1973,
4,133,769, issued Jan. 9, 1979,
4,204,966, issued May 27, 1980,
4,259,188, issued Mar. 31, 1981,
4,285,814, issued Aug. 25, 1981,
4,419,240, issued Dec. 6, 1983,
4,460,468, issued Jul. 17, 1984, and
4,490,253, issued Dec. 25, 1984.

The prior art filter apparatus having a bag with handles includes an enclosure subassembly and a bag filter subassembly. The bag filter subassembly has a filter bag and an annular member. The annular member having a pair of radial handles extending radially inwardly. The annular member having a down turned lip received in a channel in the enclosure subassembly for forming a seal therebetween.

One problem with the prior art filter apparatus is that the radial handles are relatively difficult to twist to an upright position for lifting the bag.

SUMMARY OF THE INVENTION

According to the present invention, a filter apparatus is provided. This filter apparatus comprises an enclosure subassembly and a bag filter subassembly, the bag filter subassembly having a filter bag and an annular member. The annular member having a pair of upright, axial handles, the handles having respective resilient stem portions for ease of pressing down the handles in a closed condition of the enclosure subassembly.

By using the upright handles with respective resilient stem portions, the difficulty of twisting the handles to an upright position for lifting the bag is avoided.

The foregoing and other objects, features and advantages will be apparent from the following description of the preferred embodiment of the invention as illustrated in the accompanying drawings.

DESCRIPTION OF THE PREFERRED EMBODIMENT

Figure 1:
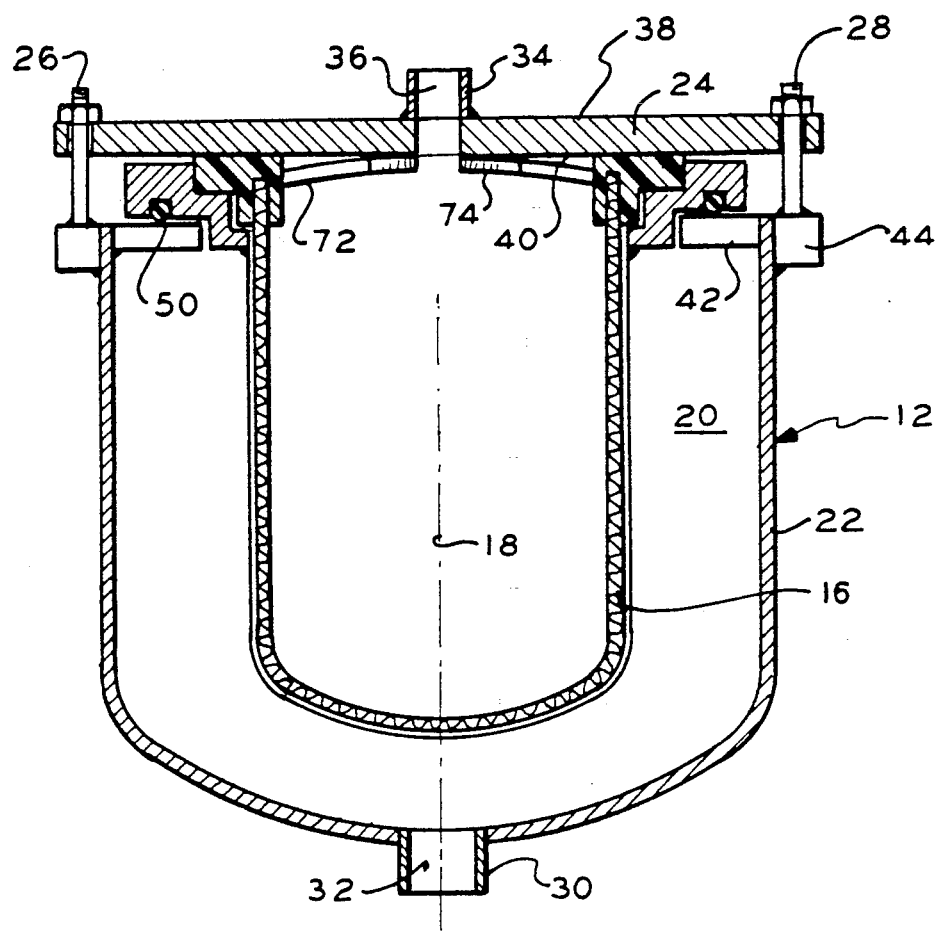
FIG. 1 is a vertical section view of a filter apparatus according to the invention.
Figure 2:
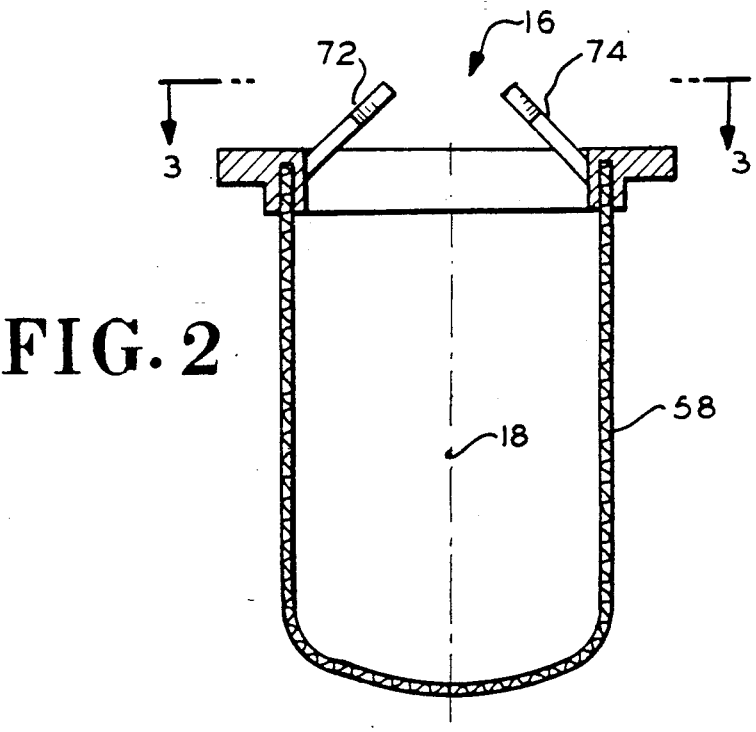
FIG. 2 is a portion of FIG. 1.
Figure 3:
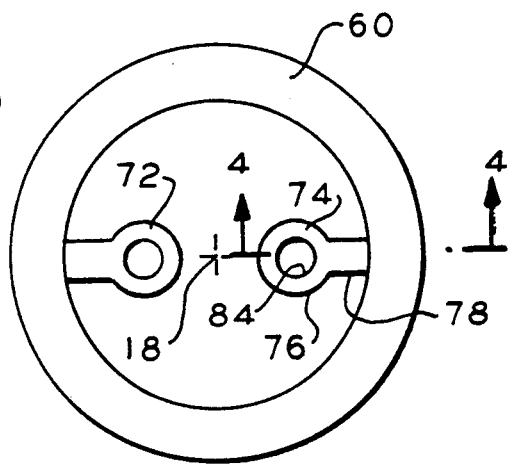
FIG. 3 is a plan section view as taken along the line 3—3 of FIG. 2.

As shown in FIGS. 1, 2, and 3 a pressure filtration apparatus 10 is provided. Apparatus 10 includes an enclosure subassembly 12, a basket subassembly 14, and a bag filter subassembly 16, which are coaxial about an axis 18. Enclosure subassembly 12 is a pressure vessel.

Enclosure subassembly 12, which encloses a chamber 20, has a housing 22, and a cover plate 24, which have a plurality of hold-down bolts 26, 28 with nuts. Housing 22 also has an outlet pipe 30 and an outlet passage 32 from chamber 20. Cover plate 24 has an inlet pipe 34 and an inlet passage 36 to chamber 20. Cover plate 24 has an upper surface 38 and a lower surface 40.

Housing 22 also has an inner flange or support bracket 42, which supports basket subassembly 14, and has an outer flange 44, which supports bolts 26, 28.

Figure 4:
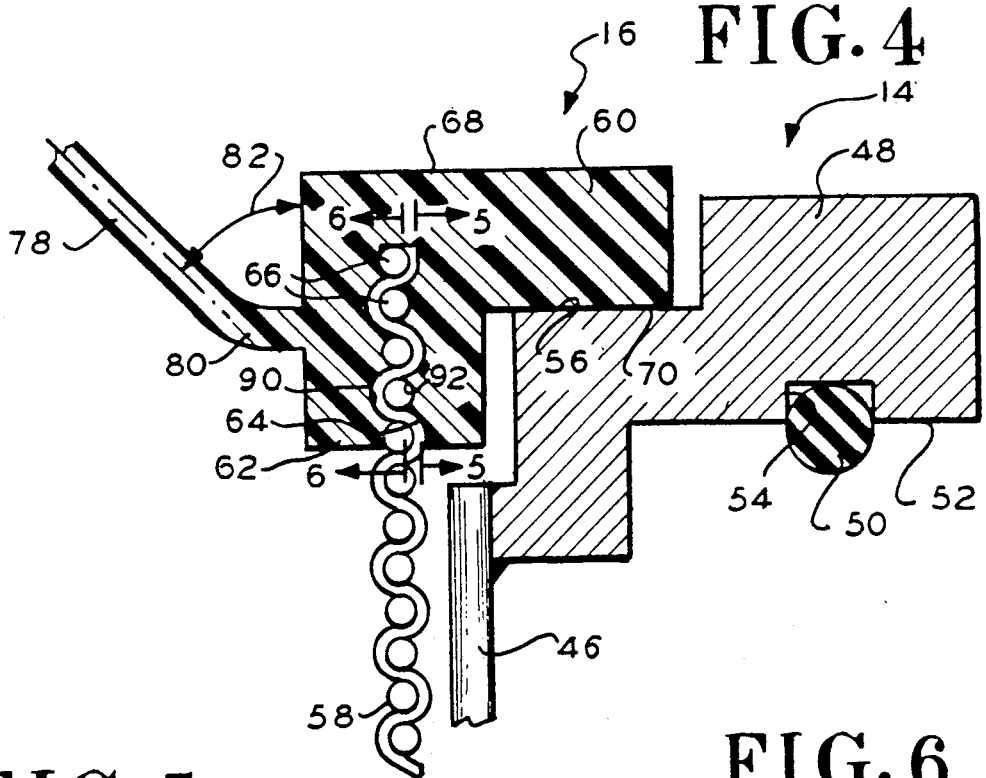
FIG. 4 is an enlarged view of a portion of FIG. 1.
Figure 5:
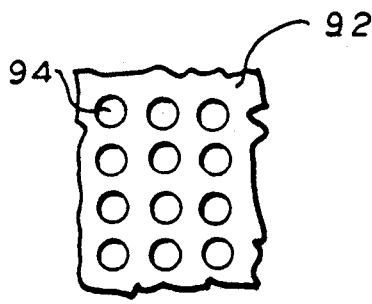
FIG. 5 is a section view as taken along the line 5—5 of FIG. 4.
Figure 6:
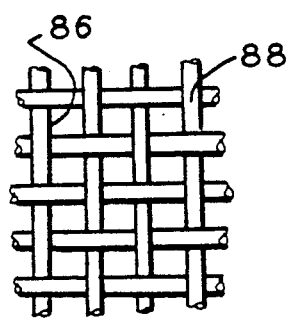
FIG. 6 is a section view as taken along the line 6—6 of FIG. 4.

As shown in FIG. 4, basket subassembly 14 has a basket portion 46, and has an annular member 48, which has an O-ring 50 of rubber-like material. Annular member 48 has an underside surface 52, which has a groove 54 that receives O-ring 50. Annular member 48 is fixedly connected to and supports basket portion 46. Annular member 48 also has an upper bearing surface 56. Annular member 48 bears on O-ring 50, which bears on inner flange 42.

Filter subassembly 16 has a filter bag 58 and an integral gasket ring 60. The gasket is preferably made from an elastomeric material. Gasket ring 60 has a vertical portion 62, which has a ring-shaped groove 64 that receives a top end portion 66 of filter bag 58. Gasket ring 60 also has a top bearing surface 68, which bears against cover lower surface 40. Ring 60 has a bottom bearing surface 70, which bears annular upper bearing surface 56. Gasket ring 60 has a left handle 72 and an opposite right handle 74 for lifting bag 58 from chamber 20.

Right handle 74, which is identical to left handle 72, has a loop portion 76 and a stem portion 78. Stem 78 has an arcuate end portion 80, which is arcuate in section view as shown in FIG. 4. End portion 80 is fixedly connected and is integral with gasket ring 60 and is molded together with gasket ring 60.

Stem 78 is disposed at an angle 82 of preferably about 45 degrees to the vertical face of the gasket ring 60. Gasket ring 60 and handles 72, 74 are composed of a moldable resilient material, such as polyurethane composition. Loop 76 has an opening 84, which is a one finger opening. Loop 76 can be made wider as required, as for a two or three or four finger opening or grip.

Filter bag top end portion 66 has microscopically small recesses and depressions 86, which are disposed between microscopically small, criss-cross fibers or strands 88 and can be a non-woven felted material or a woven cloth. Ring grove 64 has left and right, or radially inner and outer, oppositely facing sidewalls 90, 92.

Each sidewall 90 and 92 has spaced protrusions or bumps 94, which are recessed in respective depressions or recesses 86. The surface of sidewalls 90, 92 are relatively rough surfaces, which provide a shear resistance to a tension force in bag 58. The surfaces of sidewalls 90, 92 also adhere to the adjacent surfaces of end portion 66.

Filter subassembly 16 is made by placing liquid polyurethane in a mold, putting the bag top end portion, or the fabric filter medium, in the liquid, and then curing the liquid polyurethane or plastic.

Gasket ring 60 which is a molded ring made of a flexible material provides a near perfect seal between the bag 58 and the enclosure subassembly 12. Bypassing of unfiltered material between the filter bag 58 and the enclosure or vessel 12 is substantially eliminated.

Handles 72, 74 which in their relaxed state, protrude above the bag 58 and ring 60, facilitate the removal of the bag 58, when in a used contaminated condition. When the cover plate or lid 24 is closed, handles 72, 74 are pushed down into filter bag 58. When the cover plate 24 is reopened, handles 72, 74 pop up, above the opening of filter bag 58. Thus, the need to pull the handles 72, 74 out of the inside of filter bag 58 is eliminated. Also, twisting of gasket ring 60, when pulling handles 72, 74 is eliminated.

When angle 82 is at a zero angle, and a lifting force is applied to stem 78, the twisting moment on ring 60 is relatively small, so that there is no radial load which would tend to separate sidewalls 90, 92. Thus, there is no radial load which would tend to weaken the bonding or connection of bag top end portion 66 and sidewalls 90, 92.

Due to the arcuate portion 80, stem 78 can bend easily to an upright position close to the adjacent surface of ring 60, so that the moment, caused by an upward force on stem 78 and a downward force on bag 58, is relatively small. Thus, twisting of ring 60 is minimized.

The advantages of filter apparatus 10, and handles 72, 74 are indicated hereafter.

A) Handles 72, 74 pop up when cover plate 24 is removed for ease of gripping the handles 72, 74.

B) Handles 72, 74, when pulled to a fully upright position, during lifting of bag 58, apply a relatively small twisting moment on ring 60.

C) Handles 72, 74 are always out of the bag 58, when enclosure 12 is opened, so that an operator need not put his hands in the contaminated bag 58 during replacement or cleaning of bag 58.

D) Radial loads on ring 60, which tend to open groove 64 and weaken the connection of ring 60 to bag 58, are greatly minimized using handles 72, 74.

While the invention has been described in its preferred embodiment, it is to be understood that the words which have been used are words of description rather than limitation and that changes may be made within the purview of the appended claims without departing from the true scope and spirit of the invention in its broader aspects. For example, ring 60 with handles 72, 74 can be composed of another type of resilient material. Another example is that the handles 72, 74 can be made to pop up to a fully axial position, where there is about a zero angle between stem 78 and the adjacent face of ring 60, and where handles 72, 74 are disposed parallel approximately to axis 18.

What is claimed is:

1. A filter apparatus comprising:
    an enclosure subassembly having an axis and having a housing with a top flange for connections for engaging a cover plate;
    a basket subassembly having a basket portion and having an annular ring with a bottom surface with a groove with an O-ring in sealing engagement with the top flange;
    a bag filter subassembly having a filter bag and an integral resilient gasket ring having a bottom surface in sealing engagement with the annular ring and having a top surface in sealing engagement with the cover plate;
    the filter bag having a top end portion;
    the gasket ring having a groove which receives and is fixedly connected to the top end portion;
    the gasket ring having a pair of handles for axial pulling by a pair of hands;
    each of the handles having a loop portion with an opening for gripping the loop portion by a respective hand and having a resilient stem portion;
    the stem portion being disposed in an upright axial position and being bendable by the cover plate to a radial position when the cover plate is in engagement with the basket top flange.

2. The apparatus of claim 1, wherein the stem portion has an arcuate end portion integrally connected to the gasket ring.

3. The apparatus of claim 1, wherein the gasket ring is formed of elastomeric material.

4. The apparatus of claim 1, wherein the gasket ring and integral handles are composed of a polyurethane composition.

5. The apparatus of claim 1, wherein the gasket ring with integral handles is a molded unitary piece.

6. The apparatus of claim 1, wherein the cover plate has an inlet connection; the cover plate and housing enclose a chamber; and the housing having an outlet connection.

* * * * *